P. LIEBER.
Cooling and Preserving Beer.
No. 149,046. Patented March 31, 1874.
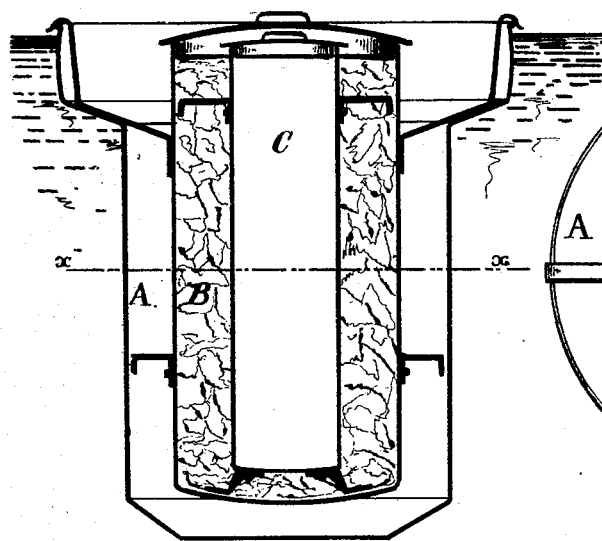
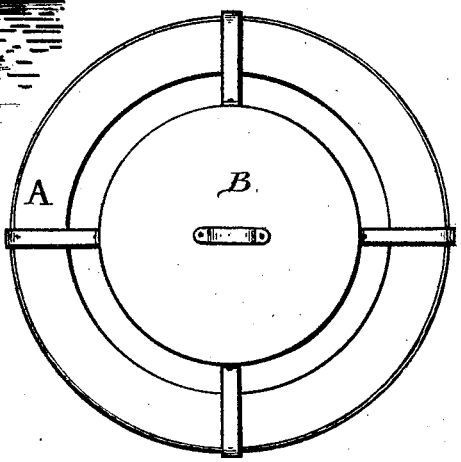
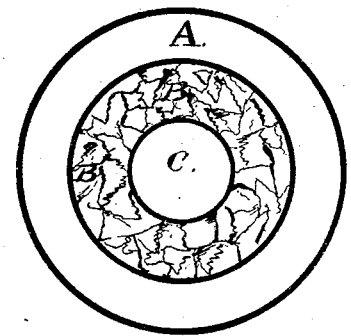
Witnesses.
O. F. Mayhew
Jacob W. Loeper
Peter Lieber, Inventor

UNITED STATES PATENT OFFICE.

PETER LIEBER, OF INDIANAPOLIS, INDIANA.

IMPROVEMENT IN COOLING AND PRESERVING BEER.

Specification forming part of Letters Patent No. 149,046, dated March 31, 1874; application filed February 14, 1874.

*To all whom it may concern:*

Be it known that I, PETER LIEBER, of Indianapolis, in the county of Marion and State of Indiana, have invented a certain Invention for Cooling and Preserving Beer, of which the following is a specification:

This invention relates to device for cooling and preserving beer and ale and similar substances in the process of manufacture, and which is required to be kept at such a temperature as to prevent its becoming sour in the process of fermentation preparatory to being barreled; and it consists in the construction and arrangement of the cooling float or swimmer employed to regulate the temperature of the beer in the fermenting-tubs, as will hereinafter be more fully explained.

Figure 1 is a vertical transverse section through the center of an apparatus for cooling and preserving beer and regulating the temperature in the fermenting-tubs embodying my invention. Fig. 2 is a top or plan view of the same. Fig. 3 is a horizontal section on line $x$ $x$, Fig. 1.

A represents the ordinary float or swimmer, being a copper vessel of the form shown, employed by brewers to regulate the temperature of the beer in the fermenting vats or tubs in which the beer or ale is fermented and brought to the proper condition to be barreled. The common mode of using this float is to simply fill it with ice and set it in the beer in the fermenting-tubs, in which it floats. My improvement consists in arranging within this float A an ice-chamber, B, and still within chamber B a water-chamber, C, as shown, the object of which is to cool the beer with a less quantity of ice, and at the same time to avail myself of the process to utilize the refrigerating effect of the surrounding ice, &c., to convert the water in chamber C into ice without detracting from the cooling effect of the ice in chamber B upon the beer, and which may, in turn, be used to charge the ice-chamber. These chambers may be made of any suitable sheet metal. The object of providing the water-space between the float A and ice-chamber B is to prevent the injurious effects of the direct contact of the float A filled with ice with the beer, as this tends to check or retard fermentation in that portion of it. It is for this reason, also, that salt or other refrigerating substances cannot be used with the ice in the float A when the latter is used alone, as this causes a still lower degree of cold, and consequently more injurious effects. The cooling apparatus devised by me avoids this, and causes the cooler to act with greater uniformity, and without checking fermentation in any part of the beer, at the same time greatly economizing ice, as the intervening water-space modifies its effect upon the beer, and also enables me to use salt with the ice, and thus greatly increase its refrigerating effect. The object of the inner water-chamber C is to utilize the refrigerating effect of the surrounding ice, &c., which converts the water therein into ice without detracting from the cooling effect of the ice in chamber B upon the beer.

To use my apparatus, the space between the ice-chamber B and float A and the chamber C are filled with water. The space between chambers C and B is filled with ice and salt or other refrigerating material, and is thus set into the beer. The chambers B and C, as arranged in the float A, are also applicable to the tank usually filled with ice, and employed for cooling the water that flows through the vertical coil of pipes, as arranged in the Bandelot beer-cooler, now in common use, and for other similar purposes.

I claim as my invention—

The cooling device composed of the ice-chamber B and the water or ice-forming chamber C, in combination with the float A, constructed and arranged substantially as and for the purpose set forth.

PETER LIEBER.

Witnesses:
O. F. MAYHEW,
JACOB W. LOEPER.